March 31, 1959  H. L. DUNLAP  2,879,722
CROSS BAR
Filed March 9, 1956  4 Sheets-Sheet 1
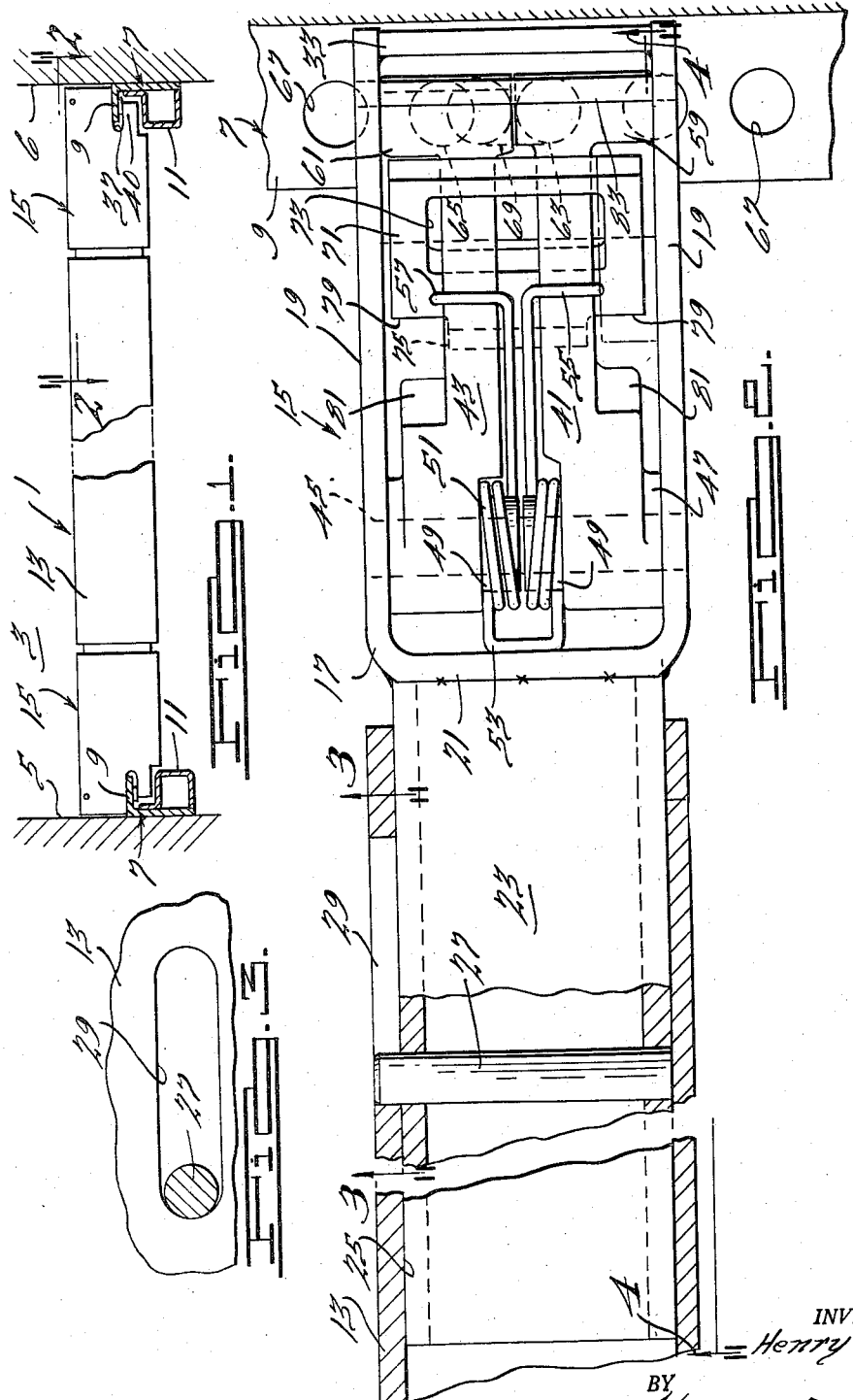
INVENTOR.
Henry L. Dunlap
BY
Harness, Dickey & Pierce
ATTORNEYS

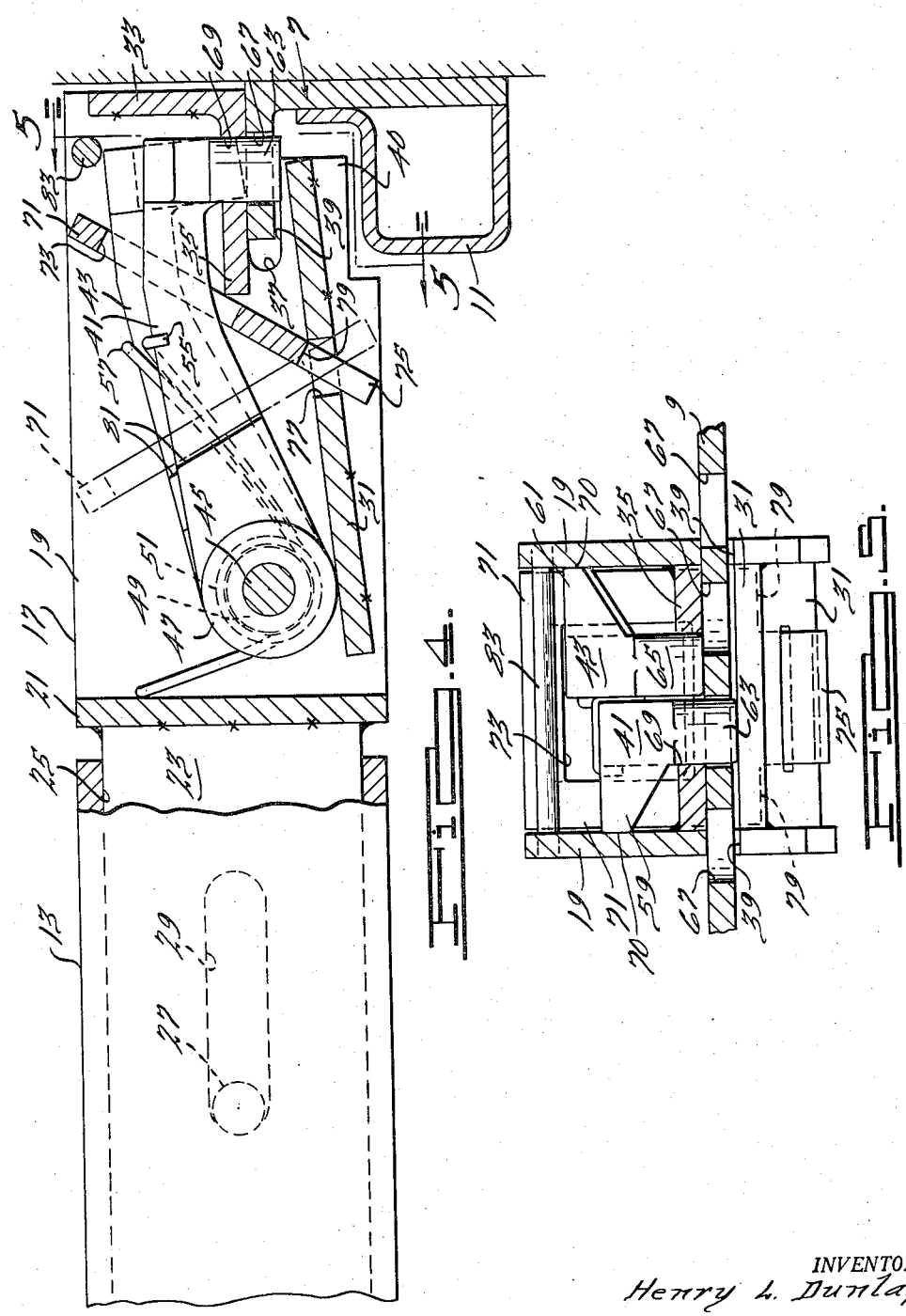

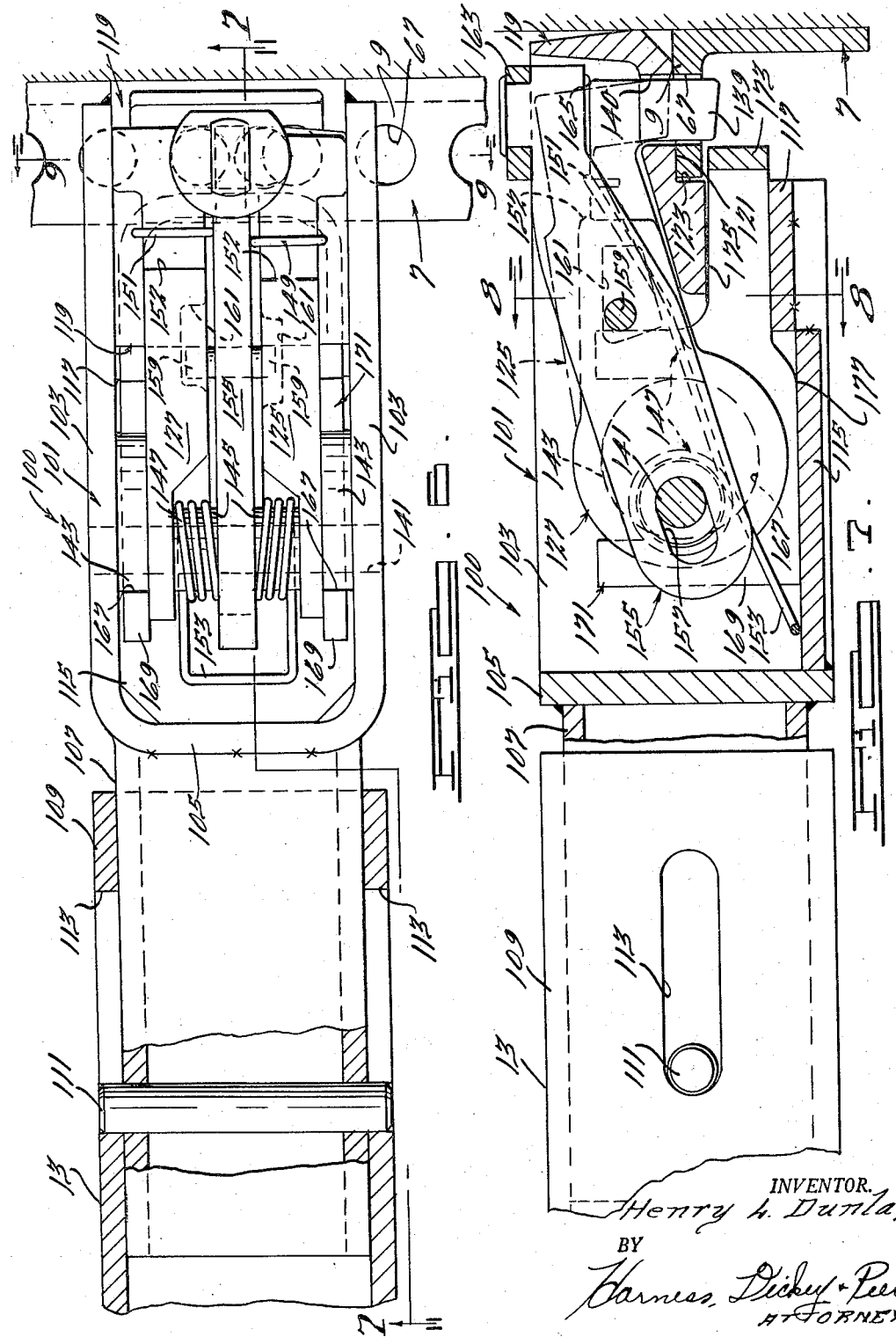

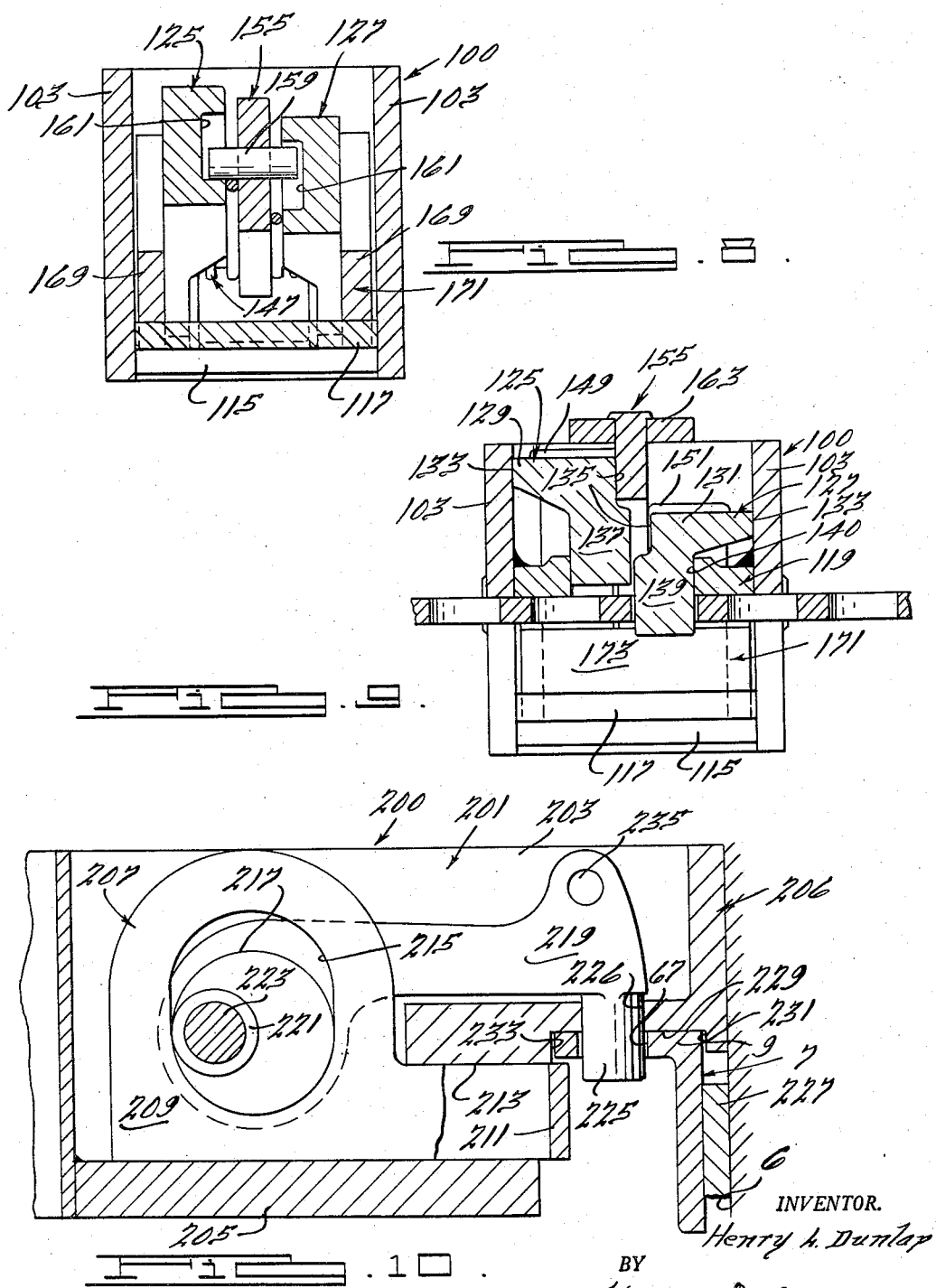

United States Patent Office 2,879,722
Patented Mar. 31, 1959

2,879,722
CROSS BAR

Henry L. Dunlap, Dearborn, Mich., assignor to Evans Products Company, Plymouth, Mich., a corporation of Delaware Application March 9, 1956, Serial No. 570,484

27 Claims. (Cl. 105—369)

This invention relates to freight or cargo bracing bars such as are commonly used in freight storage compartments to hold cargo in place.

In railroad boxcars, for example, there are considerable forces acting on the transported freight which will cause serious damage if some method of bracing is not employed. The present invention provides a freight bracing bar that can be attached to suitable support members on the side walls of the boxcar and engage and brace the freight and prevent damage thereto. The present cross bar has end headers designed so that it can be very easily connected to and disconnected from the support members and also shifted transversely of its length in increments less than the pitch of the bar holding means on the support member. Further, the design is such that the bar can properly take the various loads applied to it and can withstand substantial abuse by workmen without serious damage.

The foregoing and other features set forth hereinafter are accomplished by a construction in which the end header for the cross bar has support surfaces to engage opposite sides of a flanged support member to take loads applied in one direction transverse to the bar. The header also has a movable latch designed to engage the support member in such a way as to take loads applied in the other transverse direction as well as lengthwise of the bar. The header may also include a member for operating the latch.

The invention is illustrated by means of several preferred embodiments which are shown in the accompanying drawings in which:

Figure 1 is a schematic cross section through a freight car or other freight storage compartment and shows a freight bracing bar embodying the invention secured in operative position to supporting members;

Fig. 2 is an enlarged plan view of the cross bar of Fig. 1, partly in section, as seen from line 2—2 of Fig. 1;

Fig. 3 is a section along the line 3—3 of Fig. 2;

Fig. 4 is a section along the line 4—4 of Fig. 2;

Fig. 5 is a section along the line 5—5 of Fig. 4;

Fig. 6 is a plan view similar to Fig. 2 of a modified form of cross bar embodying the invention;

Fig. 7 is a section taken along the line 7—7 of Fig. 6;

Fig. 8 is a section taken along the line 8—8 of Fig. 7;

Fig. 9 is a section taken along the line 9—9 of Fig. 6; and

Fig. 10 is a vertical and longitudinal section taken through a cross bar having a further modified form of end head for attaching the bar to a support member.

Referring first to Fig. 1, a cross bar 1 constructed in accordance with the principles of the invention, is shown in operative position in a freight storage chamber 3 which is defined by opposite surfaces 5 and 6, these surfaces ordinarily, but not necessarily, being vertical walls such as the side walls of a freight car. Rigidly secured to the surfaces 5 and 6 by any suitable means are the cross bar support members 7 which are illustrated as being angular in shape with the vertical flanges attached to the surfaces 5 and 6 and the horizontal flanges 9 engaged by the ends of the cross bar 1. The angle members 7 have buffer sections 11 attached to their vertical flanges to prevent freight from engaging and being damaged by the relatively thin edges of the horizontal flanges 9.

The cross bar 1 comprises a relatively long central body section 13 of any suitable shape and material (though preferably square or rectangular and constructed of reinforced wood or plastic) and relatively short end headers 15, preferably of identical construction, telescopically connected to opposite ends of the body section 13. As shown, the headers 15 are preferably shaped so that they are substantially continuations of the surface defined by the body 13, thus providing the cross bar 1 with a freight engaging area that extends the full length of the bar and which contains no projections that might be engaged by freight or which might be damaged if the cross bar is thrown about by workmen.

It will be observed that in the case of a freight car or other moving vehicle where there are forces of considerable magnitude acting in all directions, the end headers 15 must be connected to the support members 7 in such a way that they resist, without disconnection, forces that are directed lengthwise of the bar 1, lengthwise of the members 7, and substantially perpendicular or transverse to the flanges 9. As seen best in Figs. 2–5, the headers 15 accomplish this by means of a construction in which a yoke or U-shaped member 17 serves as a housing for the various operating parts, the legs 19 of the housing being aligned with and a continuation of the body section 13. Welded to the base 21 of the housing 17 is a neck or tubular extension 23 that slidably fits in an opening 25 in the end of the body 13 to provide for relative axial motion or telescoping between the header 15 and the body 13. Disconnection of the header from the body is prevented by radial pin 27 affixed to neck 23 which works in a slot 29 cut in the wall of body opening 25. The slot and pin are arranged so as to dispose the legs 19 in substantially vertical planes, when the bar is used horizontally as in Fig. 1, thus leaving the header 15 with an open top, the bottom of the header being substantially closed by a transverse, slightly inclined reinforcement plate 31 welded to the insides of opposite legs 19.

The legs 19 are reinforced at their outer ends and provided with a downwardly presenting support surface to rest on the horizontal flange 9 by a transverse angle piece 33 that is welded to the legs 19. The angle 33 is disposed so that its vertical flange is at the ends of the legs and the horizontal flange 35 is disposed beneath the vertical flange and extends inwardly from the ends of the legs 19, it being spaced below the vertical midplane of the bar 1 by about the thickness of flange 9. It will be seen that the yoke 17, angle 33, and plate 31 form a sort of open top box which is high in strength but of minimum weight.

As seen in Fig. 4, the weight of the bar 1 and down loads on it will be transmitted by the bottom of flange 35 to the support member 7 on which it rests. In order to resist disconnection by up loads on the bar, the free ends of the legs 19, below angle 33, are cut out to clear buffer 11 and to provide a slot or mouth 37 that will fit over the flange 9 so that upwardly presenting surfaces 39 on lips 40 of the legs will engage the bottom of the flange 9 in the event of an up load. The cross plate 31 or other cross piece can, if desired, be readily disposed in coplanar alignment with surfaces 39 to provide an up load resisting surface extending all the way across the width of the header 19. It will be noted that plate 31 reinforces the lips 40 against distortion in case the bar is thrown out of a freight car on its end.

As thus far described, it will be seen that upon telescopic motion of the header 15 with respect to the body section, the mouth 37 can be moved either over or away from the support flange 9. Latch means is provided in the header 15 to prevent undesired telescopic motion away from the flange 9 which might cause disconnection. In addition to resisting telescopic motion, i.e., take loads running lengthwise of the bar 1, the latch means is designed to take loads that run lengthwise of the support members 7. The latch means comprises left and right hand latch or locking members 41 and 43 which extend lengthwise of the bar between the legs 19 and are pivoted at their inner ends on a cross pin 45 that is supported at opposite ends by legs 19 and which is located on a level with mouth 37 (i.e., flange 9). The latches 41 and 43 have enlarged bosses 47 on their outer sides which bear against legs 19 and somewhat smaller bosses 49 on their inner sides which are close enough together to engage each other when side loads are put on a latch member. The bosses contain the necessary apertures for the pin 45 and the inside bosses 49 further serve as a support for a torsion coil spring 51, the central portion 53 of which reacts against base 21 while the free ends 55 and 57 bear downwardly with spring force upon the tops of latches 41 and 43, respectively, at a point remote from pin 45 and on the opposite side thereof from spring section 53. The latches 41 and 43 are spaced apart outwardly of bosses 49 to accommodate sections of the spring 51 but their outermost ends 59 and 61 are enlarged so as to be wide enough to engage each other and also the legs 19. Depending downwardly from the inside sections of the ends 59 and 61 are round pins or projections 63 and 65 which are adapted to fit in similarly shaped holes 67 formed in the flange 9. The horizontal flange 35 of angle 33 has a slot 69 therein through which both pins 63 and 65 extend, the outside surfaces of the pins being capable of bearing against the ends of the slot 69 when side loads (i.e. loads running lengthwise of flange 9) are put on either latch member. Since the pivot pin 45 is on a level with the angle flange 9, the pins 63 and 65 can be dropped through holes of substantially the same diameter, thus enabling slot 69 to be made of substantially the same width as the pin diameter so that it can give maximum support to the pins. This feature also minimizes any tendency of axial loads on the bar to cause rotation of the latch lever. It will be appreciated that the depth of slot 37 can be made somewhat less than illustrated so that when the bottom thereof abuts the edge of flange 9 the pins will be in vertical alignment with the row of holes 67. The centers of pins 63 and 65 are spaced apart by a distance equal to one half the spacing of holes 67 so that only one pin at a time can fit in a hole 67 and so that one half pitch splitting with respect to the pitch of holes 67 is provided. If desired, the midpoint between the centers of pins 63 and 65 can also be offset from the center line of the bar 1 so that further pitch splitting can be obtained by reversing the bar end for end or by turning it over in which case suitable provision should be made to clear or eliminate buffer 11. Vertical pitch splitting by turning the bar over can be obtained by offsetting the bottom of flange 35 the proper distance from the midplane of the bar. It may be noted that if a non-pivotal connection with the angle 7 is desired, the pins and holes 67 may be non-circular or the latch means may be arranged so that two pins are simultaneously engaged in two holes in angle 7. This latter could be done, for example, by simply combining the two latches 41 and 43 into one single latch having two pins to engage in two holes 67, the midpoint between the pins being offset from the axis of the bar 1, if desired, to give pitch splitting by reversing the bar end for end or turning it upside down.

It will be seen that loads lengthwise of the bar 1, as caused, for example, by breathing of side walls defining surfaces 5 and 6, will be taken in shear by a pin 63 or 65 and transmitted to either the inner or outer side edge of slot 69 and thence through the angle 33 into the side legs 19, relatively little, if any, force being thrown on the cross pin 45. If it is desired to put the pins in double shear, instead of single shear as shown, the plate 31 could be extended slightly and provided with a slot aligned with slot 69 and the pins slightly lengthened so that they would act also on the side edges of such slot in plate 31 as well as on the edges of slot 69. In the case of loads running lengthwise of angles 7 and transverse to the bar 1, as caused, for example, by a shifting of cargo in space 3 when the vehicle is accelerated or decelerated, the latch members bear at two areas on the legs 19, i.e., bosses 47 and outside edges 70 of ends 59 and 61, as well as against each other so that there will be no substantial bending loads on the pivot pin 45. Further, the pins 63 and 65 bear against each other and against the ends of slot 69 with the result that such transverse loads on the bar 1 are transmitted from legs 19 into one of the pins 63 or 65 and thence into angle 7 without any possibility for them to bend the latch members or the pin 45.

In order to move the latches 41 and 43 upwardly to withdraw them from holes 67 and permit movement of the bar 1 relative to angles 7, there is provided a latch operator 71 in the form of a plate having an opening 73 through which pass the latch members. The bottom of the plate 71 is reduced in width to form a tongue 75 that fits in a slot 77 in plate 31 so that the plate 71 can be rocked over center on transverse shoulders 79. The plate 71 is in its inoperative position in the right hand (full line) position of Fig. 4. The top of plate 71 is accessible at the open top of header 15 and when it is moved to the left hand (dotted line) position of Fig. 4, the bottom of opening 73 will engage the bottoms of the latch levers 41 and 43 to lift the bottoms of pins 63 and 65 above the bottom of flange 35. In this position, spring force on the latches will tend to hold the plate 71 seated against shoulders 81 on the latches 41 and 43. Excessive upward movement of the latch levers against the force of spring 51 is prevented by a cross pin 83 which acts as an up stop for the ends of the latches.

In operation, the latch operator 71 is moved to operative or retract position as seen in phantom in Fig. 4 whereupon the head 15 can be telescopically extended so that mouth 37 fits over flange 9. Latch plate 71 is then moved to the release or right hand position in Fig. 2 to allow the pins 63 and 65 to drop under spring pressure and by gravity if the bar is upright as illustrated, so that one of the pins will be ready to enter a hole 67 as soon as the bar is shifted into alignment therewith.

In addition to the various features that have already been pointed out, it should be noted that the header construction can be readily assembled and disassembled, as required, for servicing. It is only necessary to remove pin 45 and all the movable parts can be easily withdrawn for repair or replacement.

The second embodiment, shown in Figs. 6–9, differs functionally from the header 15 just described in that it has a movable section providing the surface that engages the bottom of flange 9 instead of the fixed surfaces as provided by lip 40 in Figs. 1–5. Thus, the second embodiment can be dropped in place vertically on top of flange 9 and need not be telescoped horizontally to fit the flange 9 in a mouth such as 37. The second embodiment also differs in details of the operator for moving the latch members.

The header 100 of the second embodiment has, like header 15, a U-shaped yoke or housing 101 with side legs 103 and a base 105. A neck 107 is rigidly affixed to the base 105 and telescopes within the end 109 of the body section 13, the extent of relative movement being controlled by cross pin 111 on the neck working in slots 113 in the end 109. The yoke 101 is reinforced by a pair of bottom plates 115 and 117 welded to opposite legs 103 and by an angle shaped forging 119 welded across the outer ends of legs 103 and protruding slightly beyond the free ends thereof as will be seen in Fig. 6. The member 119 has a flat bottom surface 121 which rests on top of flange 9 and a transverse shoulder 123 to engage the edge of flange 9 to align the latch pins with the flange holes 67.

The latch members 125 and 127 are very similar in construction to the members 41 and 43. Their outer ends are transversely enlarged as seen at 129 and 131 to provide outer sides 133 that bear against the insides of legs 103 (or against sides of forging 119 if the latter is so constructed), the inside faces of the latch ends bearing against each other in the lower portions but being offset away from each other in their upper portions as seen at 135 in Fig. 9. Pins 137 and 139, corresponding to pins 63 and 65, depend downwardly from the ends of the latch members and work in a slot 140, corresponding to slot 69, formed in the horizontal flange of forging 119. The pins 137 and 139 are located on centers that are spaced apart by one half the spacing between the centers of holes 67 so that, as already described, one half pitch splitting is obtained.

The inner ends of the latches 125 and 127 are pivoted on cross pin 141 which is supported in a stationary position on side legs 103 on a horizontal level with surface 121, both being substantially on the horizontal midplane of the cross bar 1. Circular bosses 143 are formed on the outsides of the latches, to bear against legs 103, and are eccentrically located with respect to the aperture that receives cross pin 141 for a purpose to be pointed out presently. The latches have inside bosses 145, corresponding to bosses 49, through which the pin 141 concentrically passes and on which is supported the torsion coil spring 147 having its free ends 149 and 151 pressing down on the latches 125 and 127 and slidable with respect to the latches to shoulder against shoulders 152. The central portion 153 of the spring 147 reacts against base plate 115. Located between bosses 145, and in side engagement with them so that transverse loads may be carried across the parts from one leg 103 to the other, is a latch operator 155 having inclined slot 157 through which cross pin 141 passes and having oppositely extending transverse pins 159 which fit in side openings or recesses 161 formed in the inside faces of the latches 125 and 127 to operatively connect the operator 155 to the latches. The outer end of the operator 155 fits in offsets 135 at the outer ends of the latches as will be seen in Fig. 9. The operator 155 has an enlarged top 163 so that it may be readily grasped by hand from the open top of the yoke 101 and which may be located below the plane of the top surface of yoke 101, if desired, instead of projecting slightly above this plane as shown in the drawings.

It is evident that when the operator 155 is lifted it will pivot about pin 141 and that pins 159 will bear against the tops of recesses 161 to pivot the latches 125 and 127 upwardly against spring 147 and lift the pins above surface 121, the recesses 161 being deep enough to accommodate the vertical offset of the latches. The latch operator 155 can be slid outwardly by virtue of its slot 157 and the bottom 165 of its front end allowed to rest on top of forging 119 to hold the pins 137 and 139 in the elevated inoperative position though in this position the slide 171 is still unretracted and beneath the angle so that telescopic motion is required to install or remove the cross bar from the angle.

The eccentric outer bosses 143 fit in vertically elongated round bottom bearing surfaces 167 formed in opposite legs 169 of a U-shaped slide 171. The base (outer end) 173 of the slide 171 is guided between the top of plate 117 and a bottom surface 175 on forging 119 and the bottoms 177 of legs 169 slide on plate 115. It can be readily seen from Fig. 7 that when the latches 125 and 127 are lifted the bosses 143 will rotate off center about pin 141 and bear against the inner leg of surface 167 and when the operator 155 is pivoted up to approximately a vertical position they will have acted to cam the slide 171 inwardly and withdraw the projecting base 173 from under the flange 9 so that the bar 1 can be lifted directly upwardly from the angle 7 without any telescopic motion, the reverse action being true when connecting the bar 1 to the angle.

In this embodiment, the various loads are taken in substantially the same manner as in the construction of Figs. 1-5, the operator 155, however, being interposed as a transverse load transmitting member between the latches and the slide 171 transmitting up loads to plate 117 and to the bottom of the forging 119. Also, in this embodiment, the shoulder 123 may take some axial load in an outward direction. It will be observed that if it is desired to use this embodiment upside down, so that slide base 173 will rest on top of flange 9, the friction on slide 171 along with the force of spring 147 will hold the pin 137 or 139 in a hole 67 and the confinement of pin 159 in recess 161 will prevent operator 155 from dropping.

A third form of end header 200 embodying principles of the invention is shown in Fig. 10. As in the preceding forms, the header 200 has a U-shaped yoke 201 with side legs 203 and is reinforced by a bottom plate 205 and a front angle shaped member 206, both of which are welded to opposite legs 203. A slide 207, similar to slide 171, has outer legs 209 which bear against legs 203, the bottoms thereof sliding on plate 205. The outer end 211 of the slide is guided on top by the bottom 213 of angle 206. The legs 209 have oval openings 215 therein in which are seated the bosses 217 on gravity operated latch member 219. Smaller bosses 221 on member 219 will engage side legs 203 to provide transverse support. The fixed cross pin 223 is eccentric with respect to bosses 217 so that as latch 219 pivots up on the pin, the bosses will retract the end 211 from under flange 9. The latch carries one or two pins 225 working in hole or holes 226 in angle 206 to fit in holes 67 of angle 7, the angle being spaced from wall 6 by spacer 227. The bottom section 229 of angle 206 has transverse shoulders 231 and 233 which can engage opposite sides of flange 9 to locate the pins 225 above holes 67 and also help transmit forces lengthwise of the bar. It will be noticed that the shoulders 231 and 233 provide a substantially fixed end condition for the bar and will take torsional loads so that the pins are subjected only to shear loads. It will also be observed that the holes or openings 67 could be in the form of notches opening out of the edge of the surface 9 since the shoulder 231 will act to prevent inward movement of the header 200. The latch 219 has a cross pin 235 at the top thereof to engage side legs 203 and provide further transverse support as well as to provide means for grasping the latch to disengage pin 225.

Modifications may be made in the specific structures shown without departing from the spirit and scope of the invention.

What is claimed is:

1. In a freight bracing cross bar adapted to be secured to a plate-like support member extending substantially parallel to the axis of the bar, a U-shaped yoke having a base connected to an end of the bar and having the legs thereof extending outwardly with respect to the length of said bar and disposed substantially perpendicular to said support member, the outer ends of said legs having slots formed therein extending lengthwise of the bar and adapted to engage opposite sides of said support member, and a transverse reenforcement means on said yoke extending between and secured to said legs adjacent said slots, said reenforcement means including transverse members extending between and secured to said legs and located on opposite sides of said slot, at least one of said transverse members having an aperture therein adapted to be aligned with an aperture in said support member, and including a latch pin movably mounted on said yoke and adapted to extend through both said apertures.

2. The invention set forth in claim 1 including a latch lever carrying said latch pin which is to extend through said aligned apertures, and means connecting said latch lever to said yoke for angular movement to move said pin into and out of said aligned apertures.

3. In a freight bracing bar for attachment to a support member having a plurality of openings spaced therealong, a body connected to one end of the bar having a surface extending substantially parallel to the length of the bar for engaging said support member, a holding member movably mounted in said body and having a surface spaced from said first mentioned surface and extending parallel to the length of the bar for engaging the opposite side of said support member when said holding member is in one position, a movable latch member movably mounted on said body and having a projection at one end adapted to fit in said openings in said support member, means operatively connecting said latch member to said holding member so that movement of said latch member relative to said body to move said projection into one of said openings moves said holding member to said one position, and means connected to said body positively locking said holding member in said one position when said latch member is disposed with said projection extending into one of said openings in said support member.

4. The invention set forth in claim 3 including a latch operator operatively connected to the latch member for moving the same, and means connecting said latch operator to said body for movement to and from a position in which it holds the latch member and the holding member retracted from said one position.

5. In a cargo bracing bar for attachment to a plate-like support member, a housing connected to one end of the bar comprising a U-shaped member having legs spaced transversely of the bar and extending lengthwise thereof so that the free ends of the legs are at the outermost end of the bar, said housing including a transverse plate extending between the bottoms of said legs and secured thereto to provide transverse reinforcement, said housing including a transverse member located above said plate and secured to opposite legs of said U-shaped member at the free ends thereof and including an inwardly extending horizontal flange having an opening therethrough and having a downwardly presenting surface, said downwardly presenting surface being adapted to rest upon the top of a plate-like support member for the bar extending substantially parallel to the length of the bar, means connected to said housing having an upwardly presenting surface spaced below said downwardly presenting surface and adapted to engage the opposite side of said plate-like member, a pivot pin on the housing located inwardly from the ends of said legs and extending transversely thereto and parallel to said surface, a pair of latch levers pivotally mounted at their inner ends on said pin and having downwardly projecting pins at their outer ends adapted to project through the openings in said horizontal flange and extend in openings in the plate-like member, said latch levers being in transverse engagement with each other and with the legs of said U-shaped member at both their inner and their outer ends.

6. The invention set forth in claim 5 wherein said pivot pin lies substantially in a plane defined by said downwardly presenting surface.

7. The invention set forth in claim 5 including a latch operator mounted on the housing having a reduced bottom end fitting in an opening in said transverse plate and having an intermediate opening through which intermediate portions of said latch members project, said latch operator being movable over center to lift said latch members so that the downwardly presenting pins thereon are lifted above said downwardly presenting surface.

8. The invention set forth in claim 5 including a latch operator mounted on the housing in lifting engagement with both said levers intermediate their ends and pivotally mounted in said housing whereby movement of the operator will lift the levers to raise the pins above said downwardly presenting surface.

9. The invention set forth in claim 5 wherein said upwardly presenting surface comprises the bottom of a slot formed in the legs of said U-shaped member, said transverse plate being located below said slot to reinforce the leg portions defining said slot.

10. The invention set forth in claim 5 wherein said upwardly presenting surface is provided by a slide slidably supported on said plate and movable lengthwise of the bar, said latch levers having bosses thereon eccentric with respect to said pivot pin and fitting in openings in said slide whereby pivoting of the latch levers causes lengthwise movement of the slide.

11. The invention set forth in claim 10 including a latch operator mounted on the housing and connected to the levers to move the same and having a slot therein through which said pivot pin extends whereby said latch operator is pivoted about said pin and movable lengthwise of the bar, said latch operator being adapted to rest upon the top of the transverse member at the outer ends of the legs to hold the latch levers in retracted position.

12. In a cargo bracing bar for attachment to a plate-like support member, a housing connected to one end of the bar comprising a U-shaped member having legs spaced transversely of the bar and extending lengthwise thereof so that the free ends of the legs are at the outermost end of the bar, said housing including a transverse plate extending between the bottoms of said legs and secured thereto to provide transverse reinforcement, said housing including a transverse member located above said plate and secured to opposite legs of said U-shaped member at the free ends thereof and including an inwardly extending horizontal flange having an opening therethrough and having a downwardly presenting surface, said downwardly presenting surface being adapted to rest upon the top of a plate-like support member for the bar extending substantially parallel to the length of the bar, means connected to said housing having an upwardly presenting surface spaced below said downwardly presenting surface and adapted to engage the opposite side of said plate-like member, a pivot pin supported by the housing and located inwardly from the ends of said legs and extending transversely thereto and parallel to said surface, a latch lever pivotally mounted at its end on said pin and having a downwardly projecting pin at its outer end adapted to project through the opening in said horizontal flange and extend in openings in the plate-like member, said latch lever being in transverse engagement with the legs of said U-shaped member at both its inner and outer ends.

13. In a freight holding cross bar having an elongated body portion and adapted to engage freight and rest on and be adjusted along and secured to a supporting member having a horizontal flange having a plurality of apertures therethrough spaced therealong, an end header adapted to be connected to said supporting member, said end header comprising a body, means connected to said body, at the inner end thereof, connecting said body to one end of said body portion of said bar and preventing movement of said body transversely of said body portion, means on said body having a fixed downwardly presenting first surface adjacent its outer end adapted to engage the upper surface of said horizontal flange when said header is connected to said support member, and a second surface intersecting and extending upwardly from said first surface and in substantial alignment with said aperture in said support member flange when said header is connected thereto, a locking member having a projection extending laterally therefrom adjacent its outer end, means pivotally mounting said locking member at its inner end on said body for pivotal movement about an axis transverse of said bar and parallel to said first surface between an operative position in which said projection extends both above and below said first surface and is adapted to extend into one of said apertures in said flange and a retracted position in which said projection is disposed wholly at one side of said first surface, means engaging said locking member for holding it in said operative position, said second surface of said header engaging at least a portion of said projection when said locking member is in said operative position to provide transverse support for said projection.

14. The invention as defined in claim 13 wherein said second surface is similar in shape to and adapted to substantially fit at least a portion of the surface of said projection when said locking member is in said operative position.

15. In a freight holding cross bar having an elongated body portion and adapted to engage freight and rest on and be adjusted along and secured to a supporting member having a horizontal flange provided with vertically opening apertures spaced therealong, an end header, means on said end header connecting said body portion of said cross bar to said flange when said cross bar is disposed substantially horizontally, said last named means including means connected to said header mounting said header on one end of said body portion and preventing substantial movement of said header transversely of said body portion, a locking member, means pivotally mounting said locking member on said header for pivotal movement relative thereto about an axis transverse of said header and parallel to said flange and to and from an operative position in which said locking member engages said flange to connect said header thereto, said locking member having a laterally extending projection adapted when said locking member is in said operative position, to extend vertically into one of said apertures and engage said flange to limit horizontal movement in all directions of said header relative to said flange, and means engaging said locking member for holding it in said operative position, said end header having a fixed surface slidable along the upper surface of said flange and which is adapted to engage and be supported upon said upper surface of said flange when said locking member is in said operative position.

16. The invention as defined in claim 15 including means mounted on said header and engaging said locking member for pivotally moving said locking member about said axis.

17. The invention as defined in claim 15 including means carried by said header and engaging opposite sides of said locking member adjacent said projection to provide transverse support therefor.

18. The invention as defined in claim 15 wherein said axis lies substantially in the plane of said downwardly presenting surface.

19. The invention as defined in claim 15 including means connected to said header adapted to engage said locking member and hold it in said retracted position.

20. The invention as defined in claim 15 wherein said end header includes means defining a second surface, means connecting said last named means to said locking member to move said last named means, upon movement of said locking member to and from said operative position to move said second surface to and from a position in which it underlies a part of said fixed surface in spaced parallel relation thereto and is adapted to underlie a part of said flange when said header is connected to said support member.

21. The invention as defined in claim 15 including means mounted on said header effective when said header is secured to said flange of said supporting member for limiting movement of said header relative to said flange in a direction to move said fixed surface of said header away from said upper surface of said flange.

22. In a freight holding cross bar including an elongated body portion adapted to engage freight and rest on and be adjusted along and secured to a supporting member having a horizontal flange having a plurality of vertically extending apertures therein spaced therealong, an end header adapted to be connected to said supporting member and comprising a U-shaped body including a pair of spaced parallel legs and a base interconnecting the inner ends of said legs, means on said end header connecting said body portion of said cross bar to said flange when said cross bar is disposed substantially horizontally, said last named means including means connected to said base and extending therefrom in opposed relation to said legs and adapted to connect said header to one end of said body portion so that said base extends substantially at right angles to said elongated body portion and said legs are horizontally spaced and extend outwardly therefrom and longitudinally thereof, transverse support means extending between and interconnecting said legs outwardly of said base and defining a downwardly presenting surface adapted to engage said flange, said transverse support means also cooperating with said legs in defining an upwardly opening chamber in said U-shaped body, a latch member having a laterally extending projection adapted to project vertically into one of said vertically extending apertures for limiting horizontal movement in the plane of said flange, means mounting said latch member on said legs for movement relative thereto about an axis transverse to said body portion to move said projection into and out of said apertures, means connected to said latch member and disposed in said chamber and accessible through the open top thereof for moving said latch member to move said projection into and out of said apertures.

23. In a freight holding cross bar having an elongated body portion and adapted to be disposed substantially horizontally and engage freight and rest on and be adjusted along and secured to a support member having a horizontal flange having a plurality of vertically extending openings therein spaced therealong, an end header connected to one end of said body portion, means on said end header connecting said body portion of said cross bar to said flange when said cross bar is disposed substantially horizontally, said last named means including means on said header defining a surfce presenting downwardly when said elongated body portion is disposed substantially horizontally and which surface is adapted to engage the upper surface of said flange and support said header and bar thereon, a latch lever extending generally longitudinally of said bar and having a laterally extending projection adjacent its outer end, means pivotally mounting said lever adjacent its inner end on said header for pivotal movement about a horizontal axis between a first position in which said projection is adapted to vertically extend into one of said vertically extending openings in said flange and a second position in which said outer end of said lever is raised relative to said header to withdraw said projection from said flange, the center of gravity of said latch lever being located between said projection and said axis whereby the force of gravity acts to move said projection downwardly in a direction to move said projection into said openings.

24. The invention as defined in claim 23 including spring means supported on said header and acting on said latch lever at a point spaced from said axis toward said projection and urging said latch lever toward said first position.

25. The invention as defined in claim 23 wherein said means on said header defining a downwardly presenting surface adapted to engage the upper surface of said horizontal flange is disposed adjacent said outer end of said lever and also defines wall means at least partially surrounding and adapted to engage said projection when said lever is in said first position.

26. The invention as defined in claim 25 wherein said axis is substantially in the plane of said downwardly presenting surface.

27. In a freight holding crossbar having an elongated body portion adapted to engage freight and rest on and be adjusted along and secured to a supporting member, said supporting member being secured to a side wall of a freight car or the like and extending horizontally therealong and having a portion laterally offset so as to be spaced inwardly of the car from such side wall and having a plurality of openings spaced therealong, said bar comprising an end header, means on said end header for connecting said body portion of said crossbar to said laterally offset portion when said crossbar is disposed so as to extend substantially horizontally across a said freight car or the like, said last named means including means connected to said header and mounting said header on one end of said body portion and preventing substantial movement of said header transversely of said body portion, a locking member, means pivotally mounting said locking member on said header for pivotal movement relative thereto about a horizontal axis transverse to the longitudinal axis of said bar and to and from an operative position in which said locking member engages said offset portion to connect said header thereto, said locking member having a laterally extending projection adapted during movement of said locking member into and out of its operative position to move in a direction having a substantial vertical component into and out of one of said openings, said locking member being engageable with said offset portion when it is in one of said openings to limit horizontal movement of said header relative to said laterally offset portion lengthwise of said car and for limiting horizontal movement of said header in a direction away from the wall of the car, and means engaging said locking member for holding it in said operative position, said end header having a fixed surface slidable along the upper surface of said offset portion so as to support said crossbar for sliding movement lengthwise of the freight car while said locking member is out of its operative position and is withdrawn from a said opening.

References Cited in the file of this patent

UNITED STATES PATENTS

| | | |
|---|---|---|
| 442,953 | Chapman | Dec. 16, 1890 |
| 1,338,052 | Voight | Apr. 27, 1920 |
| 1,815,249 | French | July 21, 1931 |
| 1,893,729 | Call | Jan. 10, 1933 |
| 2,056,704 | Anderson | Oct. 6, 1936 |
| 2,091,869 | McCurdy | Aug. 31, 1937 |
| 2,294,795 | Moses | Sept. 1, 1942 |
| 2,309,606 | Nystrom | Jan. 26, 1943 |
| 2,425,875 | Hermann | Aug. 19, 1947 |
| 2,440,437 | Fahland | Apr. 27, 1948 |
| 2,476,362 | Fahland | July 19, 1949 |
| 2,497,683 | Nampa et al. | Feb. 14, 1950 |
| 2,556,302 | Stough et al. | June 12, 1951 |
| 2,575,550 | Fahland | Nov. 20, 1951 |
| 2,578,964 | Bell | Dec. 18, 1951 |
| 2,659,319 | Herman | Nov. 17, 1953 |
| 2,725,826 | Tobin et al. | Dec. 6, 1955 |
| 2,769,404 | Ditrichson | Nov. 6, 1956 |
| 2,806,436 | Johnston | Sept. 17, 1957 |
| 2,817,549 | Fahland | Dec. 24, 1957 |
| 2,834,304 | Chapman et al. | May 13, 1958 |
| 2,837,039 | Schueder | June 3, 1958 |

FOREIGN PATENTS

| | | |
|---|---|---|
| 10,653 of 1902 | Great Britain | May 9, 1902 |